(12) United States Patent
Oberg

(10) Patent No.: US 7,845,670 B2
(45) Date of Patent: Dec. 7, 2010

(54) TRAILER DOLLY

(75) Inventor: James D. Oberg, Eagle Bend, MN (US)

(73) Assignee: BAC Industries, Inc., Eagle Bend, MN (US)

( * ) Notice: Subject to any disclaimer, the term of this patent is extended or adjusted under 35 U.S.C. 154(b) by 181 days.

(21) Appl. No.: 12/269,465

(22) Filed: Nov. 12, 2008

(65) Prior Publication Data

US 2010/0117331 A1    May 13, 2010

(51) Int. Cl.
*B62B 1/00* (2006.01)

(52) U.S. Cl. ............... 280/476.1; 280/490.1; 280/47.24

(58) Field of Classification Search ............. 280/476.1, 280/490.1, 43.1, 47.24
See application file for complete search history.

(56) References Cited

U.S. PATENT DOCUMENTS

| | | | | |
|---|---|---|---|---|
| 2,723,130 | A | * | 11/1955 | Andrews ................. 280/47.19 |
| 3,083,950 | A | * | 4/1963 | Detwieler ................ 280/414.1 |
| 3,189,365 | A | * | 6/1965 | Blacher ................... 280/47.24 |
| 3,622,181 | A | * | 11/1971 | Smith ...................... 280/476.1 |
| 4,566,708 | A | | 1/1986 | Specie |
| 4,588,204 | A | | 5/1986 | Reed |
| 5,071,151 | A | | 12/1991 | Irwin |
| 5,139,102 | A | | 8/1992 | Pocapalia |
| 5,343,969 | A | * | 9/1994 | Taylor ...................... 180/19.1 |
| 5,716,061 | A | | 2/1998 | Sloan et al. |
| 6,024,374 | A | * | 2/2000 | Friesen ..................... 280/511 |
| 6,273,447 | B1 | | 8/2001 | Vande Berg |
| 6,637,761 | B1 | | 10/2003 | Boettcher |
| 6,663,136 | B2 | | 12/2003 | Stevens |
| 6,685,211 | B2 | * | 2/2004 | Iles ......................... 280/476.1 |
| 6,820,887 | B1 | * | 11/2004 | Riggle ..................... 280/476.1 |
| 7,237,789 | B1 | | 7/2007 | Herman |
| 7,350,790 | B1 | | 4/2008 | Wilson |
| 2003/0062699 | A1 | | 4/2003 | Gargaro |

* cited by examiner

*Primary Examiner*—Kevin Hurley
(74) *Attorney, Agent, or Firm*—Thomas J. Nikolai; Nikolai & Mersereau, P.A.

(57) ABSTRACT

In some embodiments, a trailer dolly may include one or more of the following features: (a) a main body having a proximal and distal end, (b) an adjustable hitch operably coupled to the distal end of the main body, (c) at least one wheel operably coupled to the distal end of the main body, (d) an operator's handle coupled to the main body at the proximal end, (e) at least one grip coupled to the operator's handle, (f) a V-shaped support coupled to a lower side of the main body, (g) a hitch receiving aperture coupled to the distal end of the main body, (h) a support beam operably coupled to the main body at one end and the hitch receiving aperture at an opposite end, and (i) an axle coupled to the main body at the distal end and operably coupled to the at least one wheel.

17 Claims, 3 Drawing Sheets

TRAILER DOLLY

BACKGROUND OF THE INVENTION

I. Field of the Invention

Embodiments of the present invention relate to dollies. Particularly, embodiments of the present invention relate to trailer dollies. More particularly, embodiments of the present invention relate to trailer dollies having an adjustable hitch.

II. Discussion of Related Art

A dolly (sometimes called a four-wheel dolly or a caster board) is a wheeled platform, usually without handles used to move heavy loads. It usually has four wheels or casters and a platform (or open frame) of wood, metal or plastic.

A two-wheel dolly is an L-shaped cart with two wheels on a common axle. A luggage dolly is a lightweight two-wheel dolly which collapses and/or folds into a package of approximately briefcase size. A refrigerator dolly is a large, heavy-duty, two-wheel dolly which frequently has an integral system for strapping the load to it.

A hand truck (also known as a two-wheel dolly, a stack truck, or a trolley or sack truck in the United Kingdom, or a bag barrow in New Zealand) is a L-shaped box-moving handcart with handles at one end, wheels at the base, with a small ledge to set objects on, flat against the floor when the hand truck is upright. The objects to be moved are tilted forward, the ledge is inserted underneath them and the objects are allowed to rest on the ledge. Then the truck and object are tilted backward until the weight is balanced over the large wheels, making otherwise bulky and heavy objects easier to move. Hand trucks are sometimes used as baggage carts by porters in train stations. A dolly is comparable to a hand truck. It is a first-class lever.

Some hand trucks are equipped with "stair climber wheels" which, as the name implies, are designed to go up and down stairs. Stair climber wheels can sometimes be problematic when trying to turn on flat ground as four wheels in a fixed position will be in contact with the ground.

The standard method of transporting small to medium-sized trailers is with the use of a vehicle such as an automobile or truck. The vehicle generally has a standard steel trailer hitch secured to its rear portion. The trailer generally contains a device capable of receiving the trailer hitch and securing it, so the motorized vehicle may pull the trailer to its destination.

Because larger trailers are usually heavier, they require a motorized vehicle to transport the trailer. However, for smaller trailers, such as those transporting jet skis or other small loads, the use of a motorized vehicle may not be necessary. For individuals who may not own a motorized vehicle, or for the movement of smaller loads over relatively short distances, a simpler method of transportation would be desirable.

Other patented devices discuss similar approaches to manually transporting trailers using a trailer hitch. However, none of these patented inventions include an attachment for securing a trailer hitch to a standard dolly. Allowing a user to transport the trailer without a motor vehicle is a substantial improvement over the prior art.

SUMMARY OF THE INVENTION

In some embodiments, a trailer dolly may include one or more of the following features: (a) a main body having a proximal and distal end, (b) an adjustable hitch operably coupled to the distal end of the main body, (c) at least one wheel operably coupled to the distal end of the main body, (d) an operator's handle coupled to the main body at the proximal end, (e) at least one grip coupled to the operator's handle, (f) a V-shaped support coupled to a lower side of the main body, (g) a hitch receiving aperture coupled to the distal end of the main body, (h) a support beam operably coupled to the main body at one end and the hitch receiving aperture at an opposite end, and (i) an axle coupled to the main body at the distal end and operably coupled to the at least one wheel.

In some embodiments, an apparatus for transporting trailers may include one or more of the following features: (a) a main body having a proximal and distal end, (b) an adjustable hitch operably coupled to the distal end of the main body, (c) an axle operably coupled to the distal end of the main body, (d) a ball hitch coupled to the adjustable hitch at an end opposite of a hitch receiving aperture, (e) a hitch pin to retain the adjustable hitch in a vertical position, (f) a V-shaped support which can support the main body in a non-horizontal position, and (g) vertical apertures located on the adjustable hitch for receiving the hitch pin.

In some embodiments, a trailer positioning device may include one or more of the following features: (a) a main body having a proximal and distal end, (b) a vertically adjustable hitch operably coupled to the distal end of the main body, (c) an axle operably coupled to the distal end of the main body, (d) an operator's handle coupled to the main body at the proximal end, (e) a V-shaped support coupled to a lower side of the main body, (f) a hitch receiving aperture coupled to the distal end of the main body, (g) a support beam operably coupled to the main body at one end and the hitch receiving aperture at an opposite end, and (h) a ball hitch coupled to the vertically adjustable hitch.

DESCRIPTION OF PREFERRED EMBODIMENT

Figure 1:
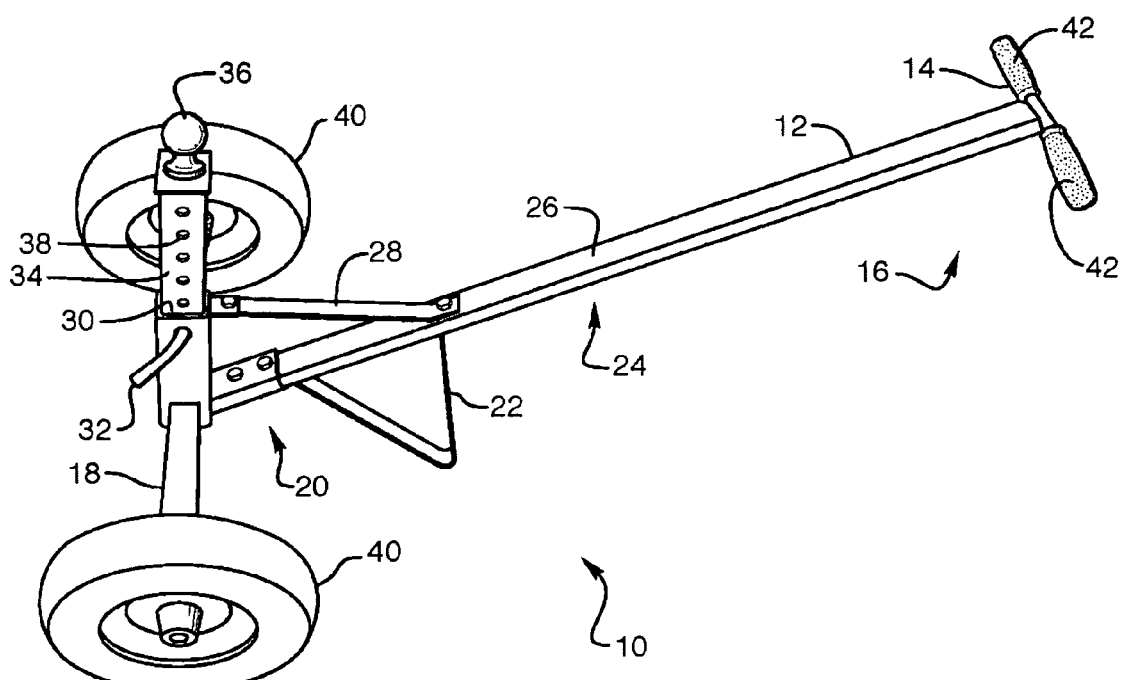
FIG. 1 shows an elevated side profile of a trailer dolly in an embodiment of the present invention.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

With reference to FIG. 1, an elevated side profile of a trailer dolly in an embodiment of the present invention is shown. Trailer dolly 10 can have a main body 12 having an operator's handle 14 at a proximal end 16 of main body 12 and an axle 18 coupled to a distal end 20 of main body 12. Also coupled to distal end 20 is a V-shaped support 22 coupled to a lower side 24 of main body 12. On an upper side 26 of main body 12 is a support beam 28 coupled to a hitch receiving aperture 30 which is also coupled to main body 12 at distal end 20. A hitch pin 32 can be used to couple adjustable hitch 34 within hitch receiving aperture 30 and can also be used to adjust the height of adjustable hitch 34 which is discussed in more detail below. At an upper portion of adjustable hitch 34 is a ball hitch 36 which can be used to couple with trailers able to receive a ball hitch. Adjustable hitch 34 also has several vertical apertures 38 for use in adjusting the height of adjustable hitch 34. Coupled at the outer ends of axle 18 are wheels 40.

Main body 12 is shown made out of a metal material, such as steel, however, main body 12 could be made out of most any durable material, such as aluminum, hardened plastic or even wood, without departing from the spirit of the invention. Operator's handle 14 can have grips 42 to assist an operator with gripping and handling trailer dolly 10. Operator's handle 14 can be coupled to main body 12 by a fastener or even welded as shown or operator's handle 14 could also be integral with main body 12. Support beam 28 and V-shaped support 22 can be coupled to main body 12 by fasteners as shown or they can be welded to main body 12 without departing from the spirit of the invention. Support beam 28 functions to add support to hitch receiving aperture 30 and adjustable hitch 34. V-shaped support 22 functions to provide support to trailer dolly 10 when an operator is not using trailer dolly 10. When an operator allows trailer dolly 10 to rest on the ground, V-shaped support 22 props up trailer dolly 10 so operator's handle 14 is extended into the air and can be easily grabbed by an operator. Axle 18 is coupled to main body 12 by welding as shown; however, most any method of coupling could be used without departing from the spirit of the invention. Wheels 40 can be most any type of wheel including a tube or tubeless tire.

Figure 2:
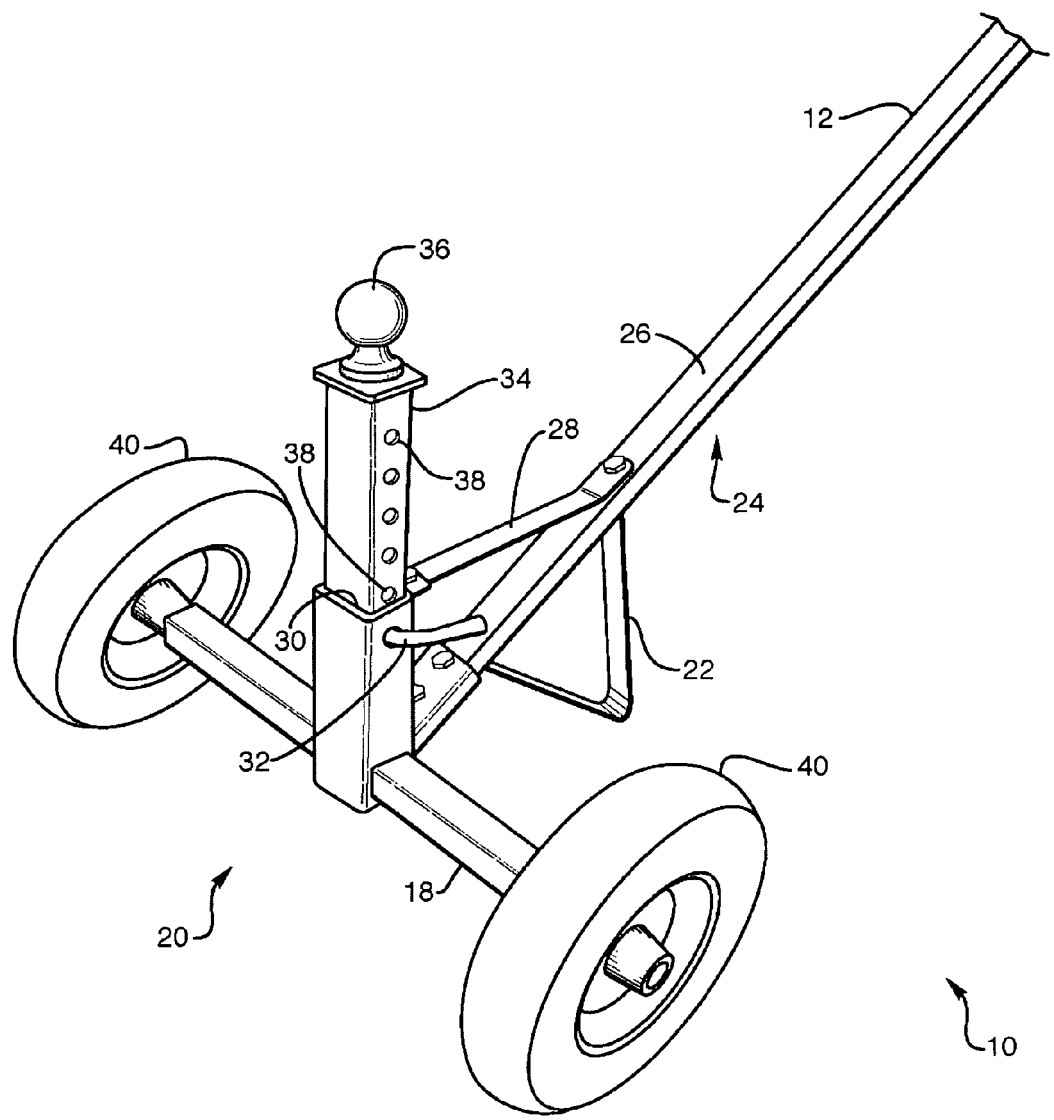
FIG. 2 shows an elevated view of a distal end of a trailer dolly in an embodiment of the present invention.
Figure 3:
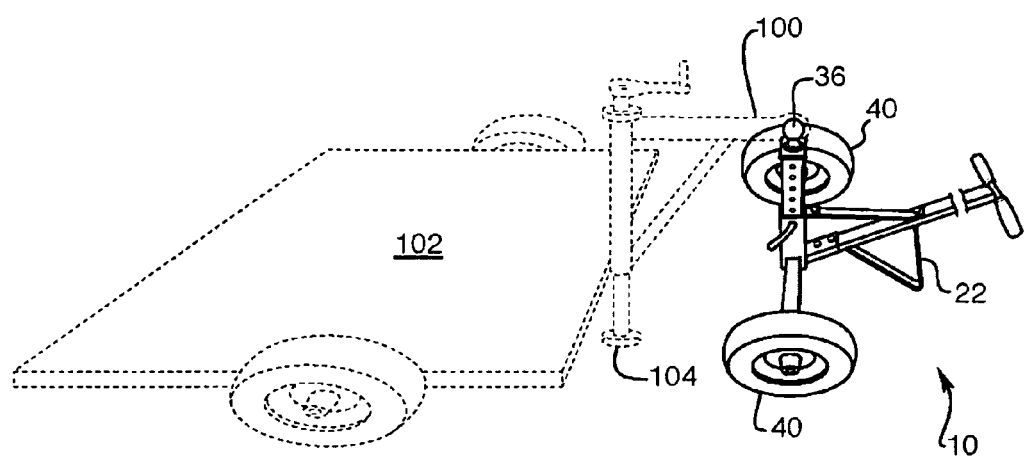
FIG. 3 shows an elevated side profile of a trailer coupled to a trailer dolly in an embodiment of the present invention.

With reference to FIG. 2, an elevated view of a distal end 20 of a trailer dolly 10 in an embodiment of the present invention is shown. In operation, an operator would pull hitch pin 32 from one of vertical apertures 38 and set adjustable hitch 34 at a height which would allow for ball hitch 36 to engage a trailer coupling 100. Hitch pin 32 is then reinserted into a vertical opening 38 to maintain adjustable hitch 34 at the desired height. It is fully contemplated other methods can be used to adjust the vertical height of adjustable hitch 34, such as pinch and release locking mechanisms or clamps without departing from the spirit of the invention. The operator can then wheel trailer dolly 10 over to a trailer 102 and engage ball hitch 36 into trailer coupling 100. The operator can allow trailer dolly 10 to rest on V-shaped support 22 while the operator adjusted trailer jack 104 for travel of trailer 102. The operator could then grasp operator's handle 14 and pull or push trailer dolly 10 with the attached trailer 102 to a desired location.

When reaching the desired trailer location, an operator can simply let trailer dolly 10 rest on V-shaped support 22 for storage until trailer dolly 10 is needed again. Or, the operator can allow trailer dolly 10 to rest on V-shaped support 22, reset trailer jack 104 to support the trailer 102 and then disconnect ball hitch 36 from trailer coupling 100.

While embodiments of the present invention are discussed and shown with respect to a ball hitch, it is fully contemplated most any type of hitch could be used, such as a draw-tite, hidden, or a Reese hitch without departing from the spirit of the invention.

Thus, embodiments of the TRAILER DOLLY are disclosed. One skilled in the art will appreciate the present teachings can be practiced with embodiments other than those disclosed. The disclosed embodiments are presented for purposes of illustration and not limitation, and the present teachings are limited only by the following claims.

I claim:

1. A trailer dolly, comprising:
    a main body having a proximal and distal end;
    a V-shaped support coupled to the distal end of the main body;
    an adjustable hitch operably coupled to the distal end of the main body; and
    at least one wheel operably coupled to the distal end of the main body.

2. The trailer dolly of claim 1, further comprising an operator's handle coupled to the main body at the proximal end.

3. The trailer dolly of claim 2, further comprising at least one grip coupled to the operator's handle.

4. The trailer dolly of claim 1, further comprising a hitch receiving aperture coupled to the distal end of the main body.

5. The trailer dolly of claim 4, further comprising a support beam operably coupled to the main body at one end and the hitch receiving aperture at an opposite end.

6. The trailer dolly of claim 1, further comprising an axle coupled to the main body at the distal end and operably coupled to the at least one wheel.

7. An apparatus for transporting trailers, comprising:
    a main body having a proximal and distal end;
    an adjustable hitch operably coupled to the distal end of the main body;
    a ball hitch coupled to the adjustable hitch at an end opposite of a hitch receiving aperture; and
    an axle operably coupled to the distal end of the main body.

8. The apparatus of claim 7, wherein the ball hitch can couple with a trailer coupling located on a trailer.

9. The apparatus of claim 7, wherein the adjustable hitch is adjustable vertically.

10. The apparatus of claim 9, further comprising a hitch pin to retain the adjustable hitch in a vertical position.

11. The apparatus of claim 7, further comprising a V-shaped support coupled to the distal end of the main body which can support the main body in a non-horizontal position.

12. The apparatus of claim 10, further comprising vertical apertures located on the adjustable hitch for receiving the hitch pin.

13. A trailer positioning device, comprising:
    a main body having a proximal and distal end;
    a vertically adjustable hitch operably coupled to the distal end of the main body;
    a ball hitch coupled to the vertically adjustable hitch; and
    an axle operably coupled to the distal end of the main body.

14. The trailer positioning device of claim 13, further comprising an operator's handle coupled to the main body at the proximal end.

15. The trailer positioning device of claim 13, further comprising a V-shaped support coupled to a lower side of the main body.

16. The trailer positioning device of claim 13, further comprising a hitch receiving aperture coupled to the distal end of the main body.

17. The trailer positioning device of claim 16, further comprising a support beam operably coupled to the main body at one end and the hitch receiving aperture at an opposite end.

* * * * *